Patented Nov. 5, 1929

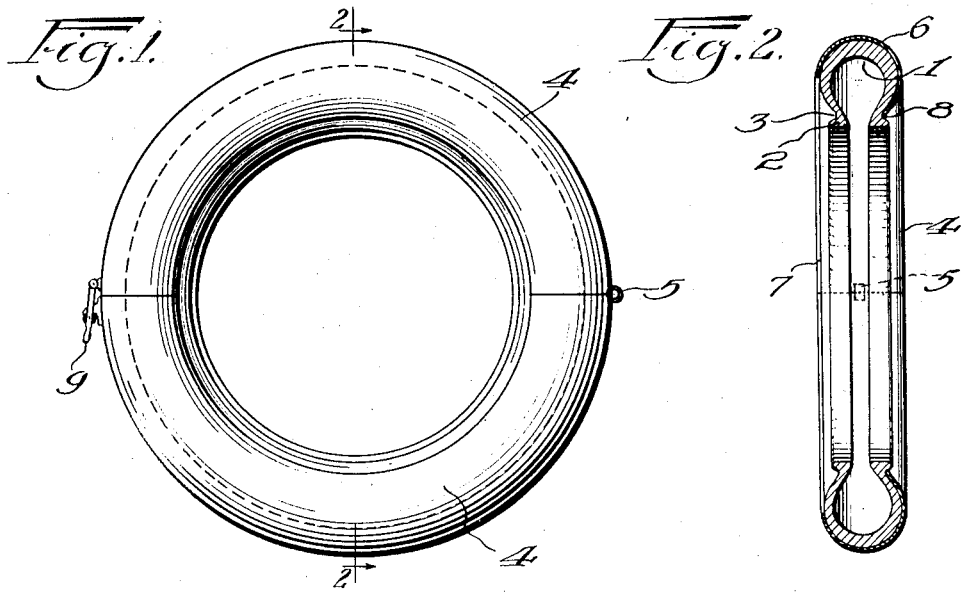
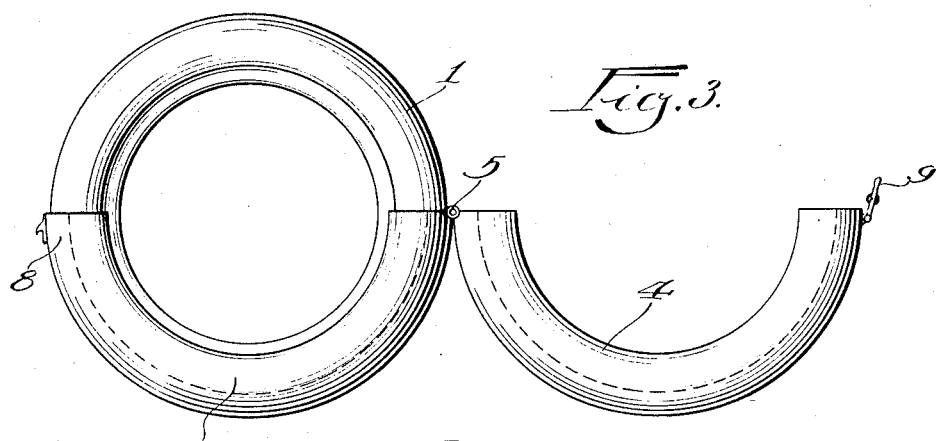
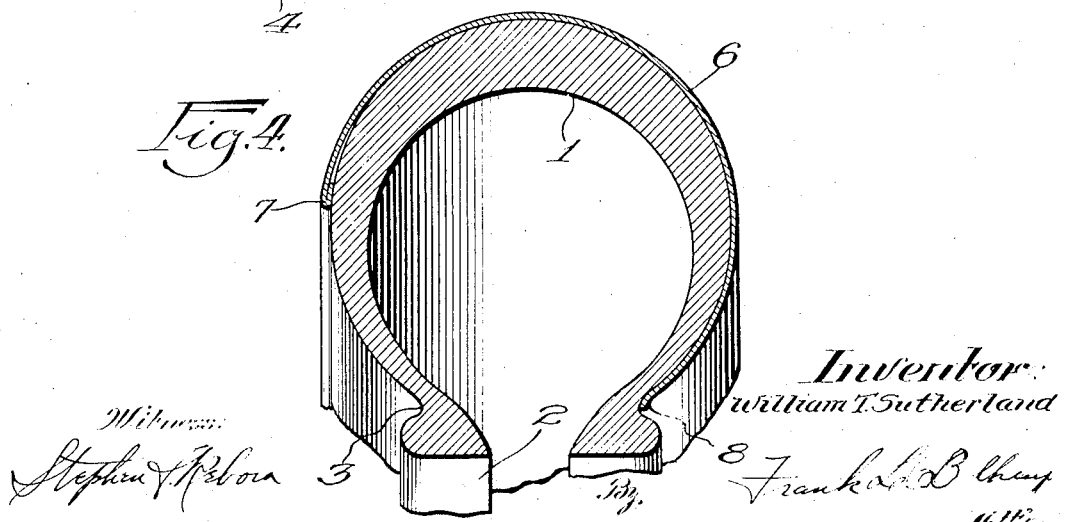

1,734,540

UNITED STATES PATENT OFFICE

WILLIAM T. SUTHERLAND, OF CHICAGO, ILLINOIS

TIRE COVER

Application filed February 26, 1926. Serial No. 90,955.

This invention relates to tire covers, and refers more particularly to an improved tire cover constructed of metal.

The specific embodiment of the present invention contemplates a tire cover made of rigid material, for instance, metal which is transversely divided into hinged sections, the contour of which conforms substantially to the contour of the tire contacting the curved wall of said tire at all points in cross section. Many attempts have been made in the past few years to perfect a tire cover which would not possess many of the disadvantages attributable to flexible fabric tire covers, particularly those having a "patent leather finish." The many objections to this type of tire cover, are too apparent to require further explanation here.

The present invention has been designed to overcome many of these difficulties, and I have provided a metal tire cover which can be assembled and dissembled easily and quickly, which cover snugly fits the contour of the tire at all points in cross section, thus providing a seal against the entrance of water and dirt. The tire cover of the present invention will have a maximum life as compared with flexible covers, and its other advantages over present types of metal tire covers, as well as flexible tire covers, will be more particularly brought out in the following description.

I am well aware that there are certain types of metal tire covers now on the market, some being longitudinally divided into sections, and others being transversely divided into sections.

However, all of the metal tire covers of the second class namely those divided transversely into sections, have side walls which do not contact the tire at all points in cross section. The metal tire cover of the present invention particularly contemplates that the side walls shall be curved to conform to the contour of the tire at all points in cross section.

In the drawing, Fig. 1 is a face view of the tire cover of the present invention in assembled position.

Fig. 2 is a cross sectional view through line 2—2 of Fig. 1. Fig. 3 is a view similar to Fig. 1, showing the sections of the tire cover separated. Fig. 4 is a greatly enlarged cross sectional view similar to Fig. 2.

Referring more in detail to the drawings, 1 designates a standard make of tire formed in the usual way with a curved wall and terminating in the usual beads 2 which are enlarged portions of the tire adapted to form a clinching connection with the rim of the tire. More particularly, in the formation of the enlarged bead portions, there are simultaneously formed on opposite sides of the tire an annular pocket 3.

The metal tire cover of the present invention comprises preferably sections 4 connected by hinges 5. It is understood of course, that there may be any number of hinged sections, which may be found desirable. Each section comprises sheet steel having a curved body portion 6 conforming exactly to the curved contour of the outer wall of the tire, one end of which terminates in the beaded edge 7 and another terminating in the slightly curved edge 8. The sections 4 are transversely divided, and therefore, there must be some provision made for allowing installation and removal. It is obvious that the two edges 7 and 8 cannot simultaneously cover and conform to the shape of the curved side walls of the tire. Being transversely divided, it will be an impossibility to do this.

I have combined the advantage of transversely dividing the sections with the advantage of having the tire cover conform to the contour of the tire at all points in cross section by having the edge 8 terminate in the pocket 3 adjacent the greatly enlarged bead 2 on one side wall of the tire, and terminating the other end 7 at a point immediately adjacent the point of greatest diameter of the tire.

It will be apparent that this construction allows easy and quick assembly and dissembly, and is a feature of greatest importance. In addition to this, it is more economical to manufacture than a metal cover having straight side walls, resulting in a great saving of material without increasing the cost of manufacture.

As another feature of the present invention, one end of the section 4 may be provided with the locking lug 8 adapted to engage the draw bolt 9. I do not wish to limit myself to any particular form of lock for the sections, but I wish to point out that it is preferable to provide a lock similar to a draw bolt arrangement, allowing a gripping purchase and leverage to draw the sections firmly together.

It will be immediately apparent to those skilled in the art, that assembly and dissembly of the present invention can be accomplished with a minimum of effort and with a minimum expenditure of time. It has the advantages of easy and quick assembly and dissembly, on a comparative basis it will be found to be more economical than the flexible tire cover.

It may be provided with a lacquer finish which will not crack, chip, peel off, nor scratch.

I claim as my invention:

1. A metal tire cover curved to conform to the transverse periphery and circumferential contour of a tire provided with beads, comprising transversely divided connected sections of metal, one annular edge of which terminates adjacent one beaded edge of the tire and beyond the point of greatest diameter of said tire, the other end terminating immediately adjacent the point of greatest diameter of the tire.

2. A metal tire cover comprising transversely divided connected sections of metal curved to conform to the transverse periphery and circumferential contour of a tire, one annular edge of said tire cover terminating beyond the point of greatest diameter of the tire, the other edge terminating immediately adjacent the point of greatest diameter on the opposite side of the tire.

WILLIAM T. SUTHERLAND.